(12) United States Patent
García Martín et al.

(10) Patent No.: US 12,703,509 B2
(45) Date of Patent: Aug. 11, 2026

(54) METHOD FOR ASSEMBLING MODULES INTO A LOAD AEROSTRUCTURE OF AN AIRCRAFT

(71) Applicant: AIRBUS OPERATIONS, S.L.U., Madrid (ES)

(72) Inventors: Diego García Martín, Madrid (ES); Carlos Flores Hernández, Madrid (ES)

(73) Assignee: AIRBUS OPERATIONS, S.L.U., Madrid (ES)

(*) Notice: Subject to any disclaimer, the term of this patent is extended or adjusted under 35 U.S.C. 154(b) by 0 days.

(21) Appl. No.: 18/990,567

(22) Filed: Dec. 20, 2024

(65) Prior Publication Data

US 2025/0206466 A1 Jun. 26, 2025

(30) Foreign Application Priority Data

Dec. 21, 2023 (EP) .................................... 23383343

(51) Int. Cl.
*B64F 5/10* (2017.01)
*B64C 1/22* (2006.01)

(52) U.S. Cl.
CPC . *B64F 5/10* (2017.01); *B64C 1/22* (2013.01)

(58) Field of Classification Search
CPC .................................... B64F 5/10; B64C 1/22
See application file for complete search history.

(56) References Cited

U.S. PATENT DOCUMENTS

| | | | | |
|---|---|---|---|---|
| 11,117,335 | B2 | 9/2021 | Lindeskov | |
| 11,845,528 | B2 * | 12/2023 | Lazar | B64C 1/10 |
| 2020/0055584 | A1 | 2/2020 | Murphy et al. | |
| 2020/0231294 | A1 | 7/2020 | Martinel et al. | |
| 2022/0041293 | A1 | 2/2022 | Alby et al. | |

OTHER PUBLICATIONS

Extended Search Report for EP23383343.3, dated Jul. 12, 2024, 5 pages.

* cited by examiner

*Primary Examiner* — Nirvana Deonauth
(74) *Attorney, Agent, or Firm* — Nixon & Vanderhye P.C.

(57) ABSTRACT

A method to load sub-modules into a aerostructure of an aircraft including: providing each sub-module with a connecting element wherein first holes are drilled in each of connecting element; drilling a second holes in the aerostructure a pattern corresponding to the first set of holes; assembling the at least one module assembly and the connecting elements by matching the second holes in the at least one structural part with corresponding ones of the first holes in the connecting elements and securing the sub-modules to the aerostructure by aligning the first holes to the second holes and attaching fasteners to the aligned holes, and attaching a connection between the sub-modules in the aerostructure.

15 Claims, 7 Drawing Sheets

2b
1b
1'
1c
2a
1a
2a 1b
2b
1
6
23
1c
20
5
8
23
2a
7
21
22
1a

METHOD FOR ASSEMBLING MODULES INTO A LOAD AEROSTRUCTURE OF AN AIRCRAFT

RELATED APPLICATION

This application incorporates by reference and claims priority to European patent application EP 23383343.3, filed Dec. 21, 2023.

TECHNICAL FIELD

The present invention belongs to the field of methods for assembling complex components such as aircraft propulsion systems in aerostructures, and particularly, it refers to a method for assembling modules including said components into a load aerostructure of an aircraft in an improved way.

BACKGROUND

In aeronautics, various structures typically comprise an assembly of elementary parts. These elementary parts include structural parts of an aerostructure, which may be metallic or made of composite materials, and components of aircraft systems, such as the propulsion system, i.e. mechanical systems, electrical systems, pneumatic systems and hydraulic systems. In most embodiments, the elementary parts and components, may be held together by one or more mechanical fasteners. Moreover, it is common to find these system components attached one by one to the corresponding structural parts of an aerostructure.

Such a mechanical fastener may include an elongated element that passes through a series of holes in each of the elementary parts to be assembled in order to tighten them. The fastener may include different types of elements, the most common being a screw working with a nut or a rivet.

Regardless of the type of mechanical fastener is used, the holes of the elementary parts to be assembled with the same fastener must be correctly designed with the optimum hole tolerance and correctly aligned during assembly. Furthermore, in the aerospace industry, current designs for loaded aerostructures, for example where the mechanical fastener is a bolted joint, require very tight tolerances between the rivet and the hole diameter of the two elementary parts being assembled in order to ensure optimum load transfer between them. For this reason, in order to guarantee the relative position between the holes of the two elementary parts to be assembled and the holes of the mechanical fastener, the most common manufacturing processes are those in which the two elementary parts to be assembled are drilled together.

A first known assembly method for assembling at least two elementary parts using mechanical fasteners in aeronautics includes a step of positioning the elementary parts to be assembled and possibly gluing them inside the structure itself to be equipped with these elementary parts. For each fastening to be provided, the final holes are then drilled in the elementary parts together, i.e. in the same drilling operation. The elementary parts are drilled together in the same way and then a fastener is inserted into the holes thus obtained. The elementary parts must first be tightened against each other using tightening tools, in particular to avoid the creation of residues at the interfaces between the elementary parts. A high degree of tightening makes it possible to avoid separation of the elementary parts during drilling. This assembly process has the advantage that it involves a single drilling operation. However, this assembly process can be difficult to implement depending on the location of the components to be assembled, particularly in an environment that makes it difficult to position the tightening tools. This is the case with the present invention.

A second known assembly method for assembling at least two elementary parts using mechanical fasteners in aeronautics is the so-called "hole-to-hole assembly", which consists of drilling each elementary part to be assembled independently one from each other to the final structural diameter, within a certain diameter and position tolerance. This first step of drilling of each elementary part independently can be done in the workshop, for example. The pre-drilled elementary parts are then aligned in relation to each other during an assembly operation through the final diameter holes already drilled in in order to position the fastener(s) once the pre-drilled elementary parts are correctly aligned.

In an example of a hole-to-hole assembly, a first elementary part and a second elementary rectangular part both have four holes distributed peripherally in each of the elementary rectangular parts thus forming a rectangular hole pattern where each of the sides of the rectangle is a hole. In this example, when drilling the first elementary part, the distance between a top right hole and a bottom left hole of a first elementary part is x, y. Similarly for the second elementary part, when drilling the second elementary part, due to deviations in the drilling system, the distance between a top right hole of the second elementary part and a bottom left of the second elementary part is x', y'. When the first and second elementary parts are assembling together in a hole-to-hole assembly, if the first fastening to be inserted is the bottom left one, assuming equal diameters, there would be a deviation in the top right hole. The maximum fastening diameter that could be inserted into the upper right hole in this example is: $d=D-|(x'-x,y'-y)|$, where d is the diameter of the hole of the fastening, and D is the diameter of the first and second elementary part holes.

As a result, the deviation in the drilling system between the two elementary parts would have to be very small, for example in the order of magnitude of 1 μm, which is beyond the capabilities of the state of the art. Consequently, this so-called "hole-to-hole assembly" would not be useful for assembling parts in aeronautics, where one of the elementary parts is a large part.

One of the main reasons for achieving high hole position accuracy in hole-to-hole assembly is the overall size of the part, particularly due to thermal expansion issues. Consequently, while it is possible to achieve hole-to-hole assembly with acceptable structural behaviour on a small elementary part, this is more difficult to achieve on large elementary parts using currently known hole-to-hole assembly methods.

The precise assembly of complex aircraft components to an aircraft load aerostructure, for example within aircraft nacelles, has several stringent requirements. The first one is that the components may have complex shapes and the aircraft load aerostructure may be large in size. Another requirement is that drilling is not allowed when aircraft systems are already installed, to prevent chips and dust from getting in touch with pipes or cables. In addition, the holes must be free of contaminants that could cause stresses that could affect the life of the assembly. Another requirement is that, in order to reduce production lead times, it is increasingly necessary to parallelize the various assembly operations on an aircraft as much as possible, by building multi-component modules that are later on assembled together on the aircraft.

SUMMARY

In view of the discussion above, the inventors identified a need in the art for a method for assembling aircraft modules including complex components into a load aerostructure of an aircraft which meets with these stringent requirements.

In a first inventive aspect, the invention provides a method for assembling modules into a load aerostructure of an aircraft, the method comprising the following steps:

a) providing at least one module assembly comprising at least a first submodule, a second submodule and at least one connection between the first and the second submodule;
b) providing at least one respective connecting element for each one of the first and second submodules, the at least one respective connecting element comprising one or more parts;
c) drilling a first set of holes with a final hole diameter in each of the connecting elements according to a respective predefined hole pattern, wherein any one of the first holes of each connecting element is spaced apart from any other first hole of the same connecting element a maximum distance “B”;
d) attaching each of the pre-drilled connecting elements to each respective submodule of the at least one module assembly;
e) drilling a second set of holes in a region of at least one structural part of the load aerostructure, for each connecting element, with a final hole diameter according to the predefined respective hole pattern such that the number, position and diameter of the first set of holes of each of the connecting elements are configured to correspond to the corresponding second set of holes, wherein there are at least as many drilled regions as there are connecting elements provided, and these drilled regions are separated from each other; and
f) assembling the at least one module assembly and the corresponding pre-drilled connecting elements with the pre-drilled structural part by matching the second holes of the structural part with the corresponding first holes of the connecting elements by respective fastening means, so that after assembly each connecting element being interposed between each region of the structural part of the load aerostructure and the respective first or second submodule.

In the context of the invention, a load aerostructure of an aircraft will be understood as any type of rigid cargo aerostructure adapted to support or carry, among other elements, a plurality of components of aircraft systems, such as the propulsion system, i.e. mechanical systems, electrical systems, pneumatic systems and hydraulic systems. A type of cargo aerostructure may be configured in the form of an aircraft nacelle.

The above steps of the method for assembling at least one module assembly into a load aerostructure of an aircraft need not be performed in the order listed.

The invention may be used to assemble modules into a load aerostructure of an aircraft in an improved manner.

According to step a) of the method according to the invention, at least one module assembly comprises at least a first submodule, a second submodule and at least one connection between the first and the second submodule.

In the context of the invention, a submodule will be understood as any type of element or assembly of elements, such as a piping assembly, electrical harnesses, pumps or tanks or any combination thereof, which is to be attached to a rigid load aerostructure of an aircraft to provide a solid support to deliver such submodule, and wherein submodules are transportable for their assembly into a rigid cargo aerostructure.

In the context of the invention, a connection between a first and a second submodule will be understood as any type of element, such as a piping assembly and/or electrical harnesses, which is to be attached to a rigid load aerostructure of an aircraft to provide a solid support to deliver such submodule.

Therefore, a module assembly will be understood as a set of components or one or more aircraft systems, to be assembled in a load aerostructure, which are arranged or supported in submodules and the connection between said submodules.

In some embodiment, one module assembly comprises only a first submodule and a second submodule being connected by at least one connection in step a). In other embodiments, one module assembly comprises one or more additional submodules, in addition to the first and second submodules, wherein each of the submodules of the module assembly is connected to an adjacent submodule by at least one connection in step a).

The submodules of the at least one module assembly may vary in type, size and/or shape depending on the specific requirements of the submodules and the load aerostructure of an aircraft. The first and the second submodules may also vary in type, size and/or shape between each other.

According to step b) of the method according to the invention, at least one respective connecting element for each one of the first and second submodules is provided, the at least one respective connecting element comprising one or more parts.

Due to the fact that the submodules of the at least one module assembly of step a) may vary in size and shape between each other, each of the connecting elements is configured to have a size and shape corresponding to the specific size and shape of each respective submodule with which it is associated.

In an embodiment, more than one connecting element is provided for each one of the first and second submodules, depending on the specific size and shape of each respective submodule. For example, more than one connecting element may be required for submodules having large dimensions.

In an embodiment, the at least one respective connecting element comprises a single part, preferably in the form of a plate. In this embodiment, the at least one part of the at least one respective connecting element has a very small thickness compared to the dimension of its extension according the other two axes perpendicular to the axis defining the thickness of the connecting element.

The at least one respective connecting element are used to hold the submodules while they are being built, that is, connecting elements (pipes, cables etc.) are mounted on the modules while each module is being manufactured.

According to step c) of the method according to the invention, a first set of holes with a final hole diameter is drilled in each of the connecting elements according to a respective predefined hole pattern. For each connecting element, any one of the holes is spaced apart from any other hole of the same connecting element by a maximum distance “B”.

In the context of the invention, a final hole diameter will be understood, as a through hole which has the final diameter required on a case-by-case basis, so that no subsequent re-drilling or reaming operations is required.

In the context of the present invention, a predefined hole pattern will be understood as a predefined hole pattern with a certain distribution of holes having a certain diameter and positional tolerance. This hole pattern is predefined depending on the size of the submodules and the load requirements of the aerostructure on which they are to be assembled.

Steps b) and c) may be performed before or after step a) in the present method.

According to step d) of the method according to the invention, each pre-drilled connecting element is attached to each respective submodule of the at least one module assembly.

Any known means of attachment, such as adhesive, can be used to attach each pre-drilled connecting element to its respective submodule.

Step d) is performed always after steps a) to c).

According to step e) of the method according to the invention, a second set of holes in a region of at least one structural part of the load aerostructure, for each connecting element is drilled. This second set of holes has a final hole diameter according to the predefined respective hole pattern, such that the number, position and diameter of the first set of holes of each of the connecting elements are configured to correspond to the corresponding second set of holes. There are at least as many drilled regions as there are connecting elements provided for each module assembly, and these drilled regions are separated from each other to ensure that the load distribution after assembly is adequate and complies with the present requirements.

Step e) may be performed after or before any of the disclosed steps a) to d).

Steps c) and e) of the method according to the invention consist in drilling each elementary part to be assembled (connecting element and a structural part of the load aerostructure) independently to the final structural diameter, according to a respective predefined hole pattern. Thus, steps c) and e) can be performed outside the load aerostructure, so that the drilling operations of the elementary parts are not performed inside the load aerostructure, thus preventing chips and dust from getting in touch with pipes or cables. Therefore, the present invention provides a method for assembling modules into a load aerostructure of an aircraft also in those cases where drilling operations are forbidden while aircraft systems are already installed.

According to step f), the at least one module assembly and the corresponding pre-drilled connecting elements with the pre-drilled structural part are assembled by matching the second holes of the structural part with the corresponding first holes of the connecting elements by respective fastening means. After the assembly of step f), each connecting element is interposed between each region of the structural part of the load aerostructure and the respective first or second submodule. In an embodiment, the assembly of step f) is performed by hole-to-hole process.

Due to the fact that both parts to be connected, i.e. the corresponding pre-drilled connecting elements (already attached to the submodules) and the pre-drilled structural part of the load aerostructure, have previously been drilled separately to the final structural diameter, before the holes of both parts to be connected are made coincident for the introduction or application of the respective fastening means. This means that, there is no need to re-drill/ream any of the parts to be connected inside the load aerostructure of an aircraft.

Step f) of the method according to the invention is always performed after the disclosed steps a) to e).

Advantageously, the present invention enables the assembly processes of modules, wherein each module comprises a plurality of groups of components being connected to each other by at least one connection, into a load aerostructure of an aircraft, instead of assembling each of the components individually into the load aerostructure of an aircraft. In particular, the present invention enables the assembly processes of modules of different shapes and sizes into a load aerostructure of different shapes and sizes, even when the components and/or the load aerostructure have complex shapes. A particular example is when the components are several complex components for aircraft propulsion systems in a load aerostructure of an aircraft. A particular example is when the load aerostructure is large.

In addition, by building multi-component modules and then assembling each module on the aircraft, rather than assembling each component individually, the interchangeability between the modules is maintained. This concept of grouping components into larger modules that are assembled on a load aerostructure of an aircraft reduces the time required to assemble the components, while making the various assembly steps independent of each other.

Another advantage of this method for assembling modules into a load aerostructure of an aircraft is that each of the steps involved is relatively simple and easy to perform.

In an embodiment, the method for assembling modules into a load aerostructure of an aircraft according to the invention comprises the further following step e2), before the step f): providing a respective aperture in the structural part of the load aerostructure for each part or the whole of a respective connecting element, wherein each aperture is smaller than the part or the whole of the respective connecting element to be mounted on that corresponding aperture, and wherein the second set of holes is drilled in a zone proximal to each aperture.

The weight of the load aerostructure is a critical aspect to be taken into account in aeronautics and it is of interest to keep it as low as possible. By providing a corresponding aperture in the structural part of the load aerostructure for each part or the whole of a respective connecting element, the additional weight of the connecting elements is counteracted by the material extracted from the apertures, and thus the present invention gives the additional advantage of maintaining a load path without increasing the weight of the load aerostructure.

In an embodiment, for a connecting element comprising at least two parts, step c) is performed for each part of the connecting element. Also, in step e), the second set of holes is drilled in a first region of a structural part for a first part of the connecting element; and in a second region of a structural part for a second part of the connecting element, the second region being proximal to the first region. Also, in step f), the assembly between the module assembly and the two parts of the connecting element to the regions of the structural part is performed by matching the holes of the regions to the corresponding holes of the parts of the connecting element, so that after assembly the first part of the connecting element is interposed between the first region of the structural part and the respective first or second submodule and the second part of the connecting element is interposed between the second region of the structural part and the respective first or second submodule.

Advantageously, the two-part connecting element allows the submodule to be attached to two structural parts of the aerostructure in two different areas of the submodules, giving greater stability to the assembly and distributing the loads between the two structural parts of the aerostructure.

In a particular embodiment, for a connecting element comprising at least two parts, the connecting element is in the form of an angle. In a particular embodiment, this angle can be a right angle.

In an embodiment, step b) of the method according to the invention comprises providing two or more connecting elements for at least one of the first and second submodules, and wherein in step e) the connecting elements are attached to the at least one of the first and second submodules such that the connecting elements are spaced apart from each other on the submodule to which they are attached.

In an embodiment, the first set of holes in each of the connecting elements is drilled in a respective peripheral region of the connecting element, preferably in a proximal region of the peripheral edge. This has the advantage that it allows a greater number of holes to be drilled far away to each other along the connecting element.

The distance "B" depends on many assumptions, such as drilling technique, joint clearance, etc. In an embodiment, in step d), the maximum distance "B" is less than 3000 mm, preferably less than 2000 mm, more preferably less than 1000 mm and even more preferably less than 500 mm.

In an embodiment, the method for assembling modules into a load aerostructure of an aircraft according to the invention further comprises the step of, after the connecting element and the corresponding structural part of the load aerostructure are pre-drilled, they are cleaned, before they are assembled. Consequently, the first and the second set of holes are free of contaminants that could cause stresses that could affect the life of the assembly.

In an embodiment, the step f) of the method according to the invention is performed by bolting and/or riveting.

In an embodiment, the first submodule or the second submodule or the at least one connection between said first and second submodules or any combination thereof are resilient.

In some cases, the first submodule and/or the second submodule are resilient and, in other cases, the at least one connection between said first and second submodules comprises is a resilient connection.

In the context of the invention, a resilient element will be understood as an element capable to support stress loads.

Since the first submodule or the second submodule or the at least one connection is resilient, the resulting assembly is capable of absorbing a higher level of loads than the separated submodules isolated.

In an embodiment, the module assembly comprises a mechanical system or an electrical system or a pneumatic system or a hydraulic system or a combination thereof, distributed between the at least first and second submodules and being part of the at least one connection between said first and second submodules.

In an embodiment, the module assembly comprises one or more pipes and/or one or more electric harnesses and/or one or more pumps and/or one or more reservoirs.

In an embodiment, the at least one connecting element is metallic or made of a composite material.

In an embodiment wherein the method according to the invention comprises the further following step e2), before the step f), each aperture is provided in substantially the same shape as the corresponding contour of the connecting element.

In an embodiment, any of the steps c), e), f) of the method according to the invention described above or any combination thereof is performed by numerical control.

In an embodiment, the structural part of the load aerostructure is one of the following or a part of the following: floor, frame or beams.

In an embodiment, the load aerostructure is a nacelle of an aircraft. The aircraft nacelle can be, for example, intended for hosting a fuel cell system, thermal management system, air supply and, thrust generation (propeller).

In a particular embodiment of the embodiment wherein the load aerostructure is a nacelle of an aircraft, the nacelle comprises a primary structure comprising a ceiling, a floor and transverse frames connecting the ceiling and the floor, wherein: the primary structure of the nacelle is provided without assembling at least one of the side walls so that at least one lateral face of the primary structure of the nacelle is opened; in step f), the at least one module assembly and the corresponding pre-drilled connecting elements are installed in the load aerostructure for their assembly using the at least one open lateral face of the primary structure of the nacelle; and after step f), the method further comprises installing the at least one side wall of the primary structure of the nacelle to close the at least one lateral face of the primary structure of the nacelle.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from preferred embodiments of the invention, given just as examples and not being limited thereto, with reference to the drawings.

DETAILED DESCRIPTION

Figure 1:
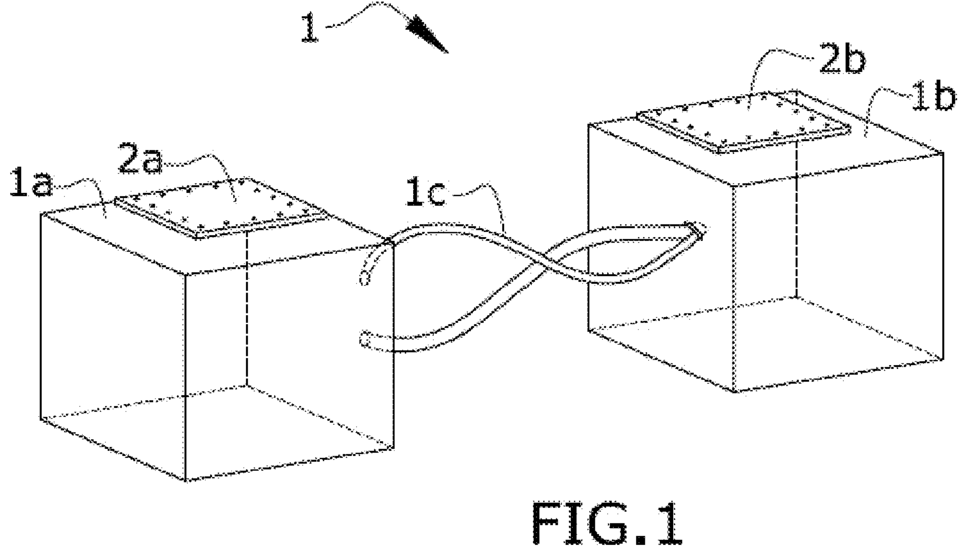
FIG. 1 is a schematic perspective view of a module assembly with a respective drilled connecting element attached to each of the submodules resulting from step d) of the method according to an embodiment of the present invention.
Figure 5:
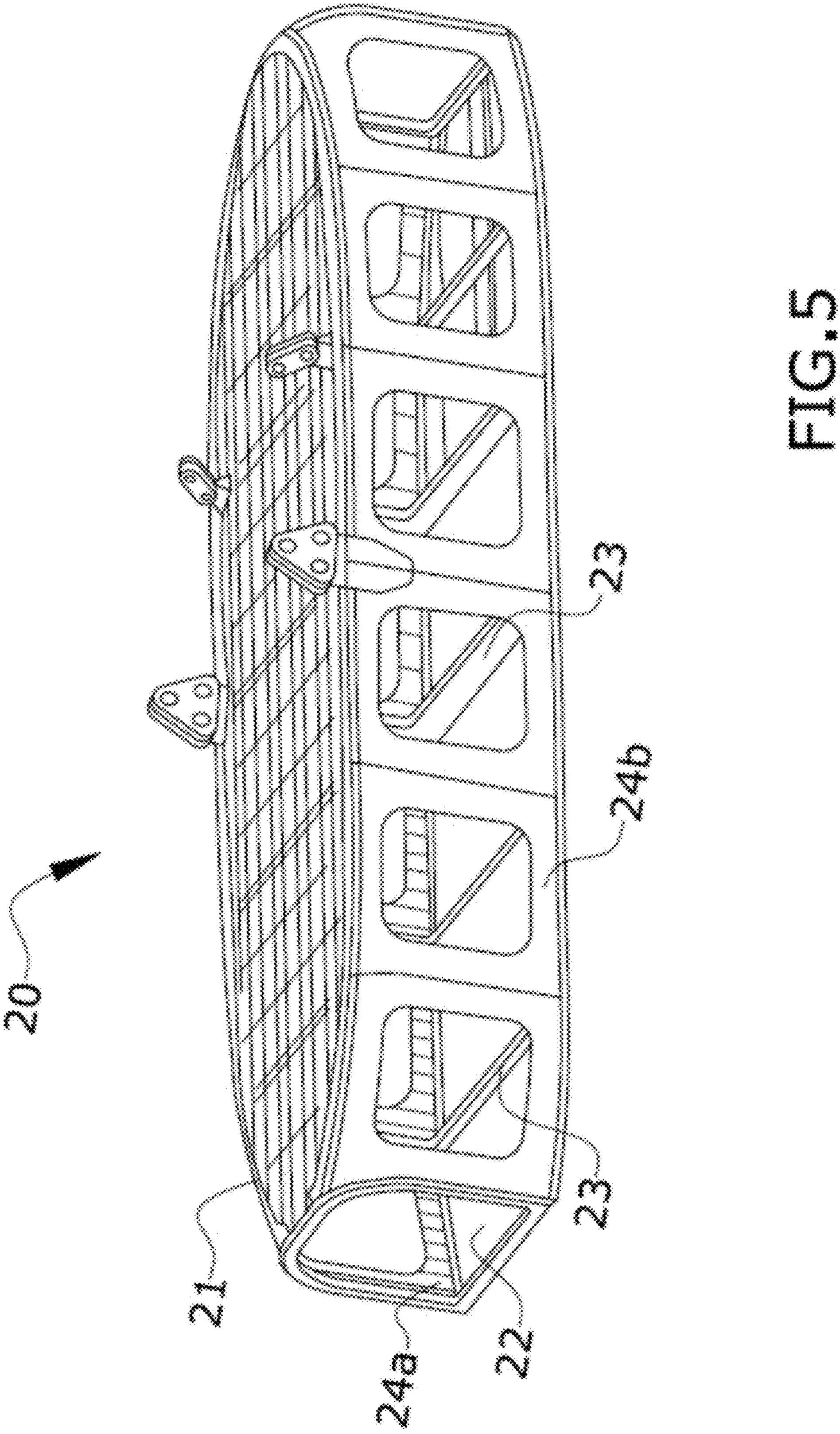
FIG. 5 is a schematic perspective view of a load aerostructure, which is a nacelle of an aircraft, in a first stage of the assembly method, into which a module assembly is assembled in accordance with an embodiment of the assembly method of the present invention.
Figure 6:
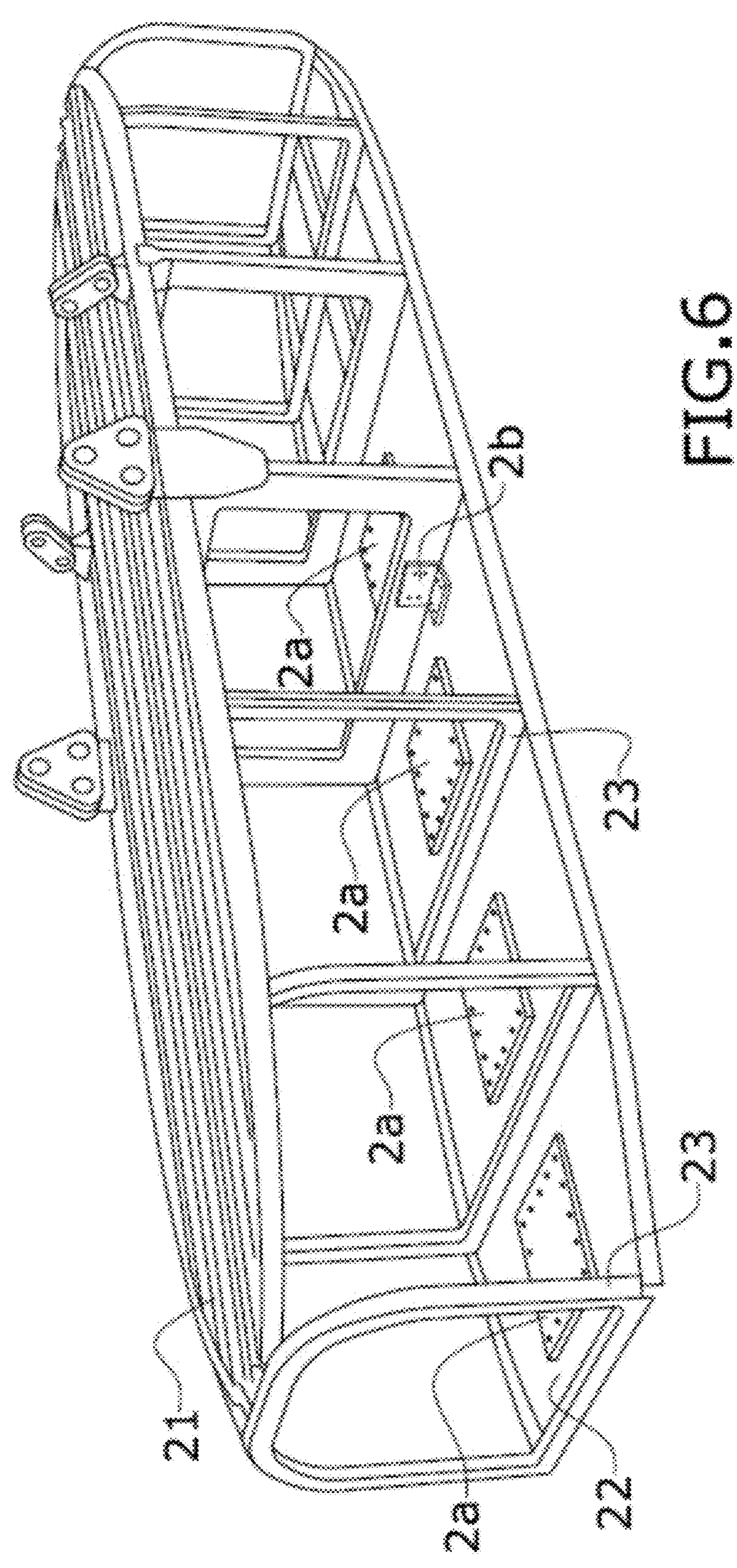
FIG. 6 is a schematic perspective view of the same embodiment of a load aerostructure as shown in FIG. 5, in a second stage of the assembly method, into which a module assembly is assembled in accordance with an embodiment of the assembly method of the present invention.
Figure 7:
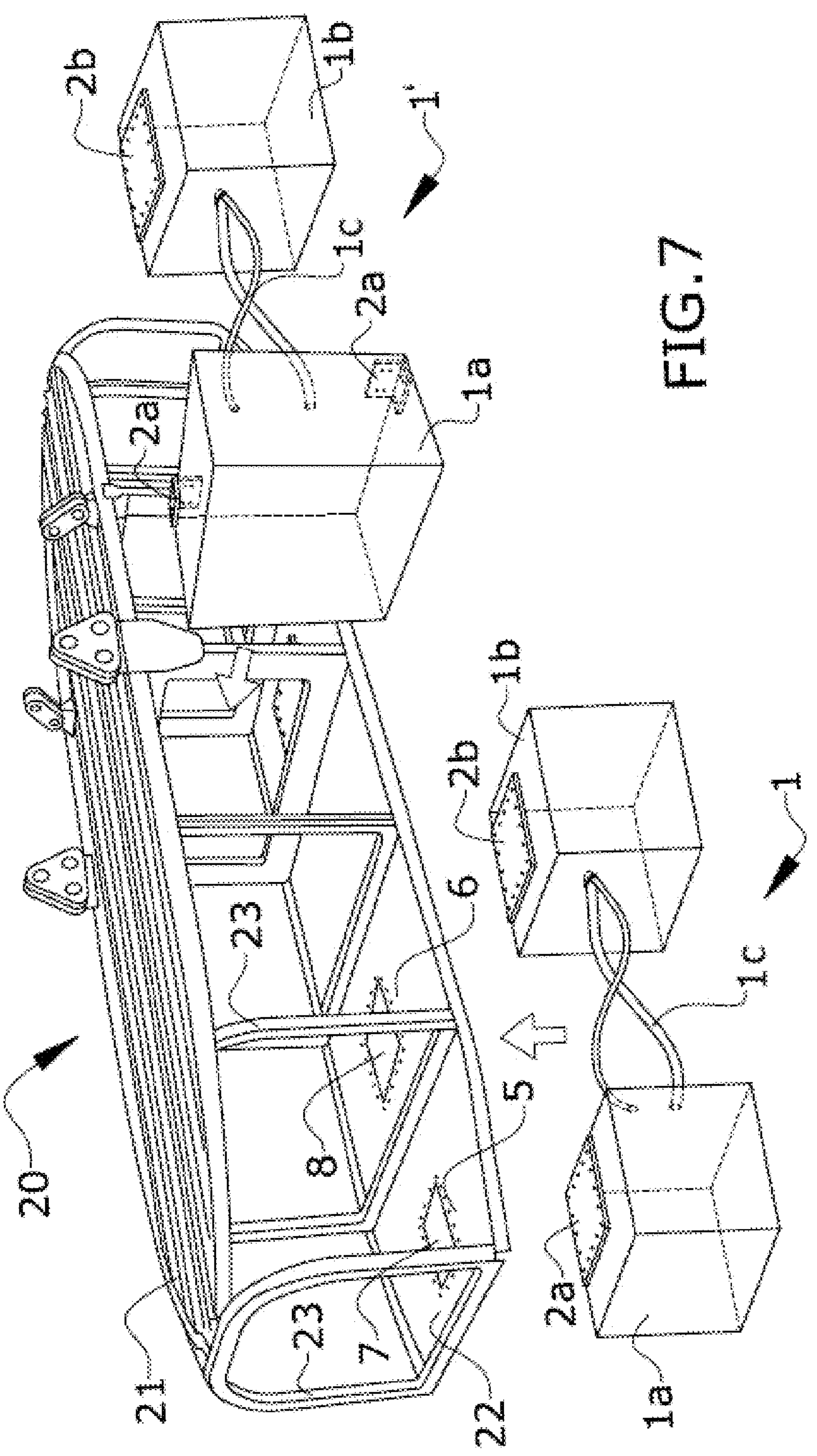
FIG. 7 is a schematic perspective view of the same embodiment of a load aerostructure as shown in FIGS. 5 and 6, in a third stage of the assembly method, into which a module assembly is assembled in accordance with an embodiment of the assembly method of the present invention.

FIG. 1 shows an embodiment of a first module assembly (1) comprising a first submodule (1*a*), a second submodule (1*b*) and a connection (1*c*) that connects the first (1*a*) and second (1*b*) submodules. This module assembly (1) comprises a combination of mechanical systems, electrical systems, pneumatic systems, hydraulic system, pipes, electric harnesses, pumps and reservoirs, distributed along the submodules (1*a*, 1*b*) and the connection (1*c*) between such submodules (1*a*, 1*b*). These submodules (1*a*, 1*b*) have been represented in a cubic form that corresponds to an envelope structure that supports all of the above systems that are intended to be installed in load aerostructure such as a nacelle (20) of an aircraft (9) (as shown in FIGS. 5 to 7). This first submodule (1*a*) or second submodule (1*b*) or the connection (1*c*) or any combination thereof is resilient.

This FIG. 1 further shows a connecting element (2*a*, 2*b*) for each one of the submodules (1*a*, 1*b*), wherein these connecting elements (2*a*, 2*b*) are plate-shaped and are already drilled. In addition, this figure shows a first plate-shaped connecting element (2*a*) attached to the first submodule (1*a*) and the second plate-shaped connecting element (2*b*) is attached to the second submodule (1*b*).

Figure 2:
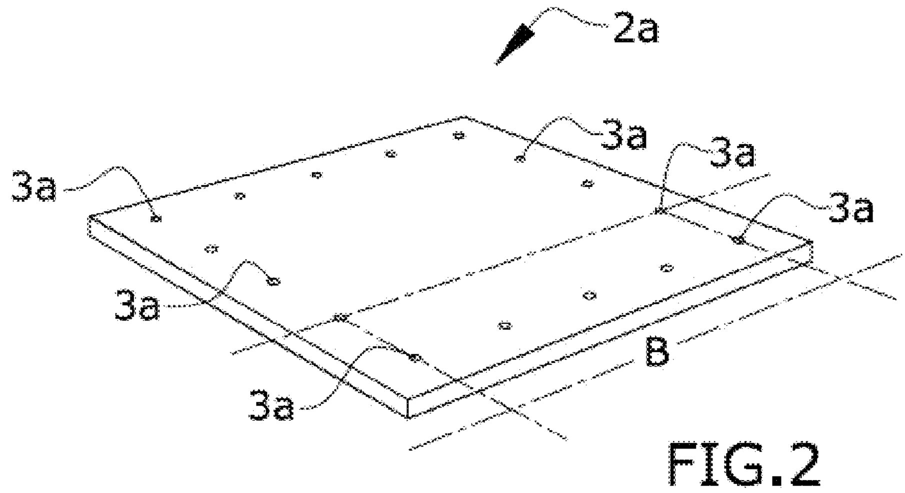
FIG. 2 is a schematic perspective view of the connecting element for one submodule of the module assembly seen in FIG. 1.

FIG. 2 shows the first connecting element (2*a*) of FIG. 1 with a first plurality of first holes (3*a*) already drilled. These first holes (3*a*) are separated from each other and have a final hole diameter according to a predefined hole pattern. Furthermore, this FIG. 2 shows the maximum distance "B" that can be provided between two first holes (3*a*) in the same first connecting element (2*a*). Specifically, these first holes (3*a*) are arranged closer to the perimeter edge of the first connecting element (2*a*).

Figure 3:
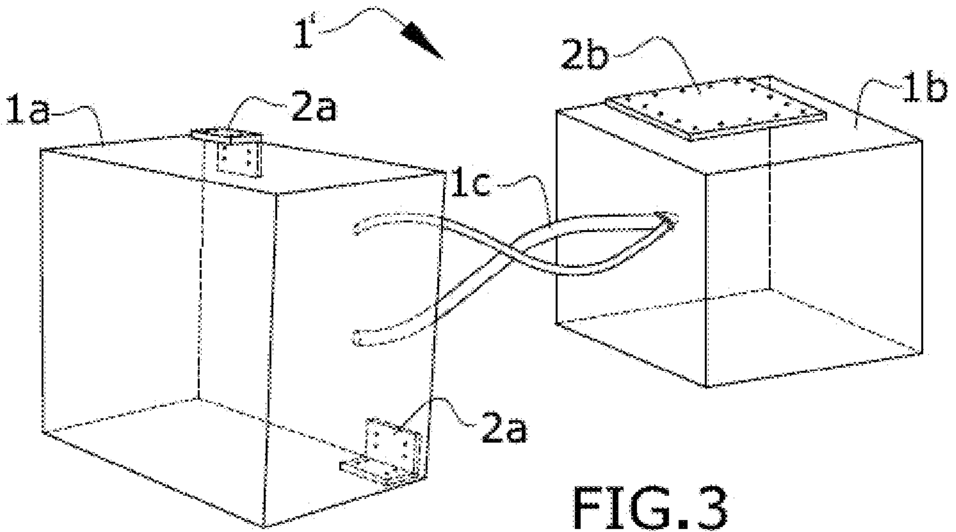
FIG. 3 is a schematic perspective view of a module assembly with respective drilled connecting elements attached to each of the submodules resulting from step d) of the method according to another embodiment of the present invention.
Figure 4:
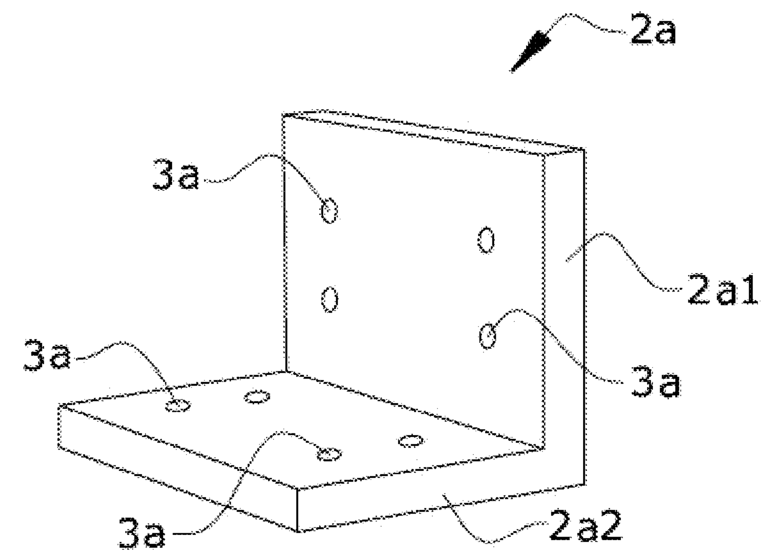
FIG. 4 is a schematic perspective view of the connecting element for one submodule of the module assembly seen in FIG. 3.

FIG. 3 shows another embodiment of a second module assembly (1') also comprising a first submodule (1*a*), a second submodule (1*b*) and a connection (1*c*) that connects the first (1*a*) and second (1*b*) submodules as in the embodiment shown in FIG. 1. According to this FIG. 3, there are two first connecting elements (2*a*), of angular shape and already drilled, attached to the first submodule (1*a*), and there is a second connecting element (2*b*) with a plate shape and attached to the second submodule (1*b*). Particularly, FIG. 4 shows in detail one of the angularly shaped connecting element (2*a*) configured to be attached on an external part of the first submodule (1*a*) shown in FIG. 3. This angularly shaped connecting element (2*a*) comprises two parts (2*a*1, 2*a*2) at an angle of 90° to each other. Each part (2*a*1, 2*a*2) of the connecting element (2*a*) comprises a plurality of first holes (3*a*) which are separated from each other and comprising a final hole diameter according to a predefined pattern. This angularly shaped connecting element (2*a*) is configured to be attached to two external parts of the first submodule (1*a*) as shown in FIG. 3.

FIG. 5 shows a nacelle (20) of an aircraft (9) when assembled, comprising a primary structure formed by a ceiling (21), a floor (22), transverse frames (23) that connects the ceiling (21) to the floor (22), and side walls (24*a*, 24*b*). The ceiling (21), the floor (22), the transverse frames (23) and the side walls (24*a*, 24*b*) are structural parts (10) of the nacelle (20). This nacelle (20) is intended for hosting a fuel cell system, thermal management system, air supply and, thrust generation (propeller).

FIG. 6 shows the same nacelle (20) as in FIG. 5 but without the side walls (24*a*, 24*b*) and with first connecting elements (2*a*) attached to the floor (22) and a second connecting element (2*b*) attached to the floor (22) and a transverse frame (23). This figure shows how the connecting elements (2*a*, 2*b*) would be attached to the floor (22) and the transverse frame (23) respectively, according to an embodiment in which the first and second module assemblies (1, 1') would be arranged between the floor (22) and the ceiling (21).

FIG. 7 shows the same nacelle (20) as in FIG. 5 but without the side walls (24*a*, 24*b*) and with the provision of apertures (7) on the floor (22) and a second set of holes (4) in a region (5) of the floor (22) around each aperture (7). This figure also shows a first module assembly (1) according to FIG. 1 which is to be attached to the nacelle (20) in such a way that the connecting elements (2*a*, 2*b*) already drilled and attached to the submodules (1*a*, 1*b*) are going to be assembled with the floor (22) of the nacelle (20) by matching the second set of holes (4) of the floor (22) with the corresponding first set of holes (3*a*, 3*b*) of the connecting elements (2*a*, 2*b*). The arrow shows how this first module assembly (1) will be assembled in the nacelle (20), i.e. below the floor (22).

In addition, FIG. 7 shows the embodiment of a second module assembly (1') of FIG. 3 to be attached to the nacelle (20) in such a way that the connecting elements (2*a*, 2*b*) already drilled and attached to the submodules (1*a*, 1*b*) are going to be assembled with the floor (22) and transverse frame (23) as appropriate for each submodule (1*a*, 1*b*) by matching the second set of holes (4, 5) of the floor (22) and transverse frame (23) (not shown) with the corresponding first set of holes (3*a*, 3*b*) of the connecting elements (2*a*, 2*b*). In this case, the arrow shows how this second module assembly (1') will be assembled inside the nacelle (22).

Figure 8:
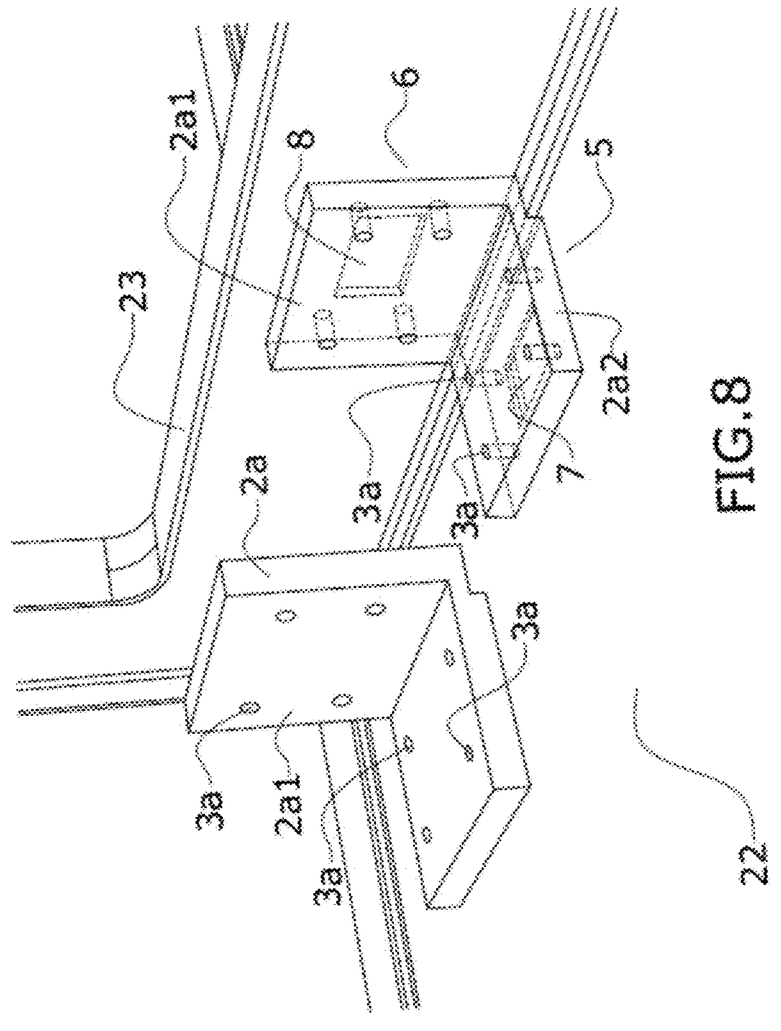
FIG. 8 is a schematic perspective view of an embodiment of a connecting element having an angular shape at two different times of step f) of the assembly method of the present invention, in particular when the connecting element is separated from the pre-drilled structural part of a load aerostructure and when it is aligned with the holes of the structural part of a load aerostructure.

FIG. 8 shows an angularly shaped connecting element (2*a*) in two times or positions, a first position in which the connecting element (2*a*) is speared from the apertures (7, 8) of the floor (22) and the transverse frame (23) respectively, and a second position in which the first set of holes (3*a*) of the connecting element (2*a*) are aligned with the second set of holes (4) already drilled on the floor (22) and the transverse frame (23). These second holes (4) are arranged around the apertures (7, 8) on the floor (22) and the transverse frame (23). Specifically, according to a first part (2*a*1) of the connecting element (2*a*), the first holes (3*a*) are aligned with the second holes (4) of the transverse frame (23); and according to a second part (2*a*2) of the connecting element (2*a*), the first holes (3*a*) are aligned with the second holes (4) of the floor (22). Moreover, the connecting element (2*a*) shown in this FIG. 8, comprises a recess in which the first (2*a*1) and second (2*a*2) parts of the connecting element (2*a*) are in contact. This recess is provided to fit on a ledge arranged between the floor (22) and the frame (23).

Figure 9:
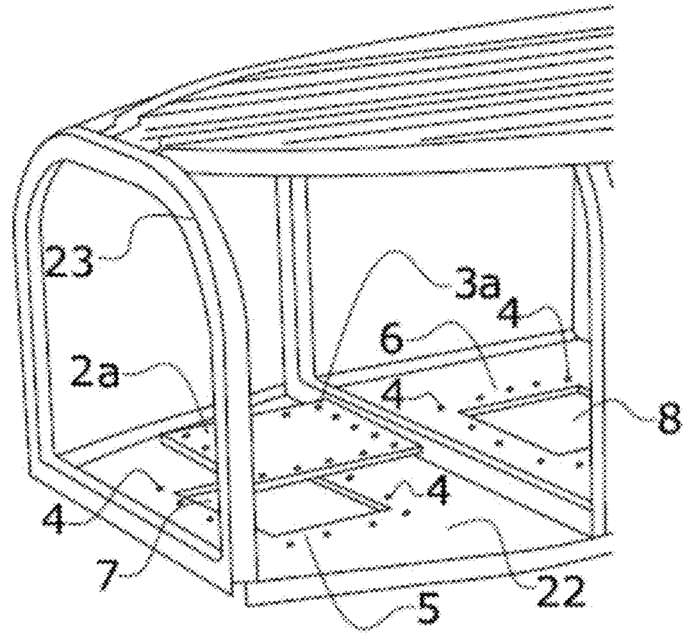
FIG. 9 is a schematic perspective view of another embodiment of a plate-shaped connecting element at a time of step f) of the assembly method of the present invention, in particular when the connecting element faces the pre-drilled structural part of a load-bearing aerostructure but is still separated therefrom.

FIG. 9 shows the plate-shaped connecting element (2*a*) of FIG. 2 facing to the floor (22) of the nacelle (22) but separated from the floor (22).

In an embodiment, the connecting elements (2*a*, 2*b*) shown in the figures described above are metallic or made of a composite material or any combination thereof.

Figure 10:
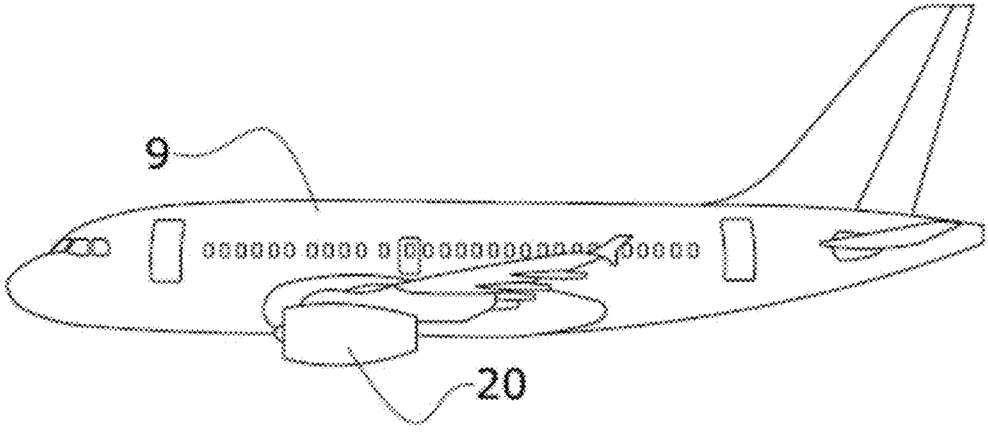
FIG. 10 is a schematic view of an aircraft, having at least one load aerostructure, into which a module assembly is assembled according to an embodiment of the method of the present invention.

FIG. 10 shows an aircraft (9) comprising a nacelle (20) according to an embodiment of the present invention.

Furthermore, the present invention describes a method for assembling modules into a load aerostructure of an aircraft (9). An example of a method for assembling modules into a nacelle (20) of an aircraft (9) in relation to the figures described above is described as follows. The method comprises the following steps:

a) providing a first module assembly (1) as the one shown in FIG. 1 and a second module assembly (1') as the one shown in FIG. 3;

b) according to the first module assembly (1) providing a first plate-shaped connecting element (2*a*) for a first submodule (1*a*) and a second plate-shaped connecting element (2*b*) for a second submodule (1*b*); and according to the second module assembly (1') providing two first angular shaped connecting elements (2*a*) for a first submodule (1*a*) and a second plate-shaped connecting element (2*b*) for the second submodule (1*b*); the plate-shaped connecting elements corresponding to the one shown in FIG. 2 and the angular shaped connecting element corresponding to the one shown in FIG. 4;

c) drilling a first set of holes (3*a*, 2*b*) with a final hole diameter in each of the connecting elements (2*a*, 2*b*) already provided and according to a respective predefined hole pattern; wherein for each connecting element (2*a*, 2*b*) any one of the holes (3*a*, 3*b*) is spaced apart from any other hole (3*a*, 3*b*) a distance no greater than “B”; and wherein this maximum distance “B” is preferably less than 500 mm;

d) for the first module assembly (1) attaching the pre-drilled first plate-shaped connecting element (2*a*) to the first submodule (1*a*) and the pre-drilled second plate-shaped connecting element (2*b*) to the second submodule (1*b*); and for the second module assembly (1') attaching the pre-drilled first angular shaped connecting elements (2*a*) to the first submodule (1*a*) and the pre-drilled second plate-shaped connecting element (2*b*) to the second submodule (1*b*);

e) for the first module assembly (1) drilling second holes (4) in a first region (4) and second region (5) of the floor (22) with a final hole diameter according to the predefined hole pattern such that the number, position and diameter of the plate-shaped connecting elements (2*a*, 2*b*) are configured to correspond to the corresponding second holes (4); and for the second module assembly (1') drilling second holes in a first regions (5) of the floor (22) and a second region (6) of the transverse frame (23) with a final hole diameter according to the predefined hole pattern such that the number, position and diameter of the angular shaped connecting elements (2*a*) and the plate-shaped connecting element 82*b*) are configured to correspond to the corresponding second holes (4); and f) assembling the first module assembly (1) and the corresponding drilled connecting elements (2*a*, 2*b*) with the pre-drilled floor (22) by matching the second holes (4) of the floor (22) with the corresponding first holes (3*a*, 3*b*) of the connecting elements (2*a*, 2*b*) by respective fastening means; and assembling the second module assembly (1') and the corresponding drilled connecting elements (2*a*, 2*b*) with the pre-drilled floor (22) and pre-drilled transverse frame (23) by matching the second holes (4) of the floor (22) and the transverse frame (23) with the corresponding first holes (3*a*, 3*b*) of the connecting elements (2*a*, 2*b*) by respective fastening means; and wherein the assembly is performed by bolting and/or riveting.

The method further comprises before step f), for the first module assembly (1) providing a first aperture (7) and a second aperture (8) in the floor (22) as shown in FIG. 7; and for the second module assembly (1') providing a first aperture (7) on the floor (22) and a second aperture on the transverse frame (23) for one angular shapes connecting element (2*a*), a first aperture (7) on the transverse frame (23) and a second aperture (8) on the ceiling (21) (not shown) for the other angular shaped connecting element (2*a*), and a first aperture (7) ono the floor (22) for the plate-shaped connecting element (2*b*). In addition, the apertures (7, 8) are provided in substantially the same shape as the contour of the corresponding connecting elements (2*a*, 2*b*), i.e. a rectangular shape as shown in FIGS. 7 to 9.

In an embodiment, any of the steps of the method described above or any combination thereof is performed by numerical control.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling modules into a load aerostructure of an aircraft, the method comprising:

a) providing at least one module assembly comprising at least a first submodule, a second submodule and at least one connection between the first submodule and the second submodule;

b) providing connecting elements for the first submodule and the second submodule, wherein each of connecting elements includes one or more parts;

c) drilling a first set of first holes with a final hole diameter in each of the connecting elements according to a predefined hole pattern for each of the connecting elements, wherein at least one of the first holes in a respective one of the connecting elements is spaced apart from another hole of the first holes in the same one of the connecting elements by a maximum distance B;

d) after the step c), attaching each of the connecting elements to a respective one of the first submodule and the second submodule of the at least one module assembly;

e) for each of the connecting elements, drilling a second set of second holes in a region of at least one structural part of the load aerostructure, wherein each of the second holes has the final hole diameter and is arranged according to the predefined respective hole pattern such that a respective second hole of the second holes corresponds to a respective first hole of the first holes; and f) after the step e), assembling the at least one module assembly and each of the connecting elements by matching each of the second holes in the at least one structural part with a corresponding first hole of the first holes in each of the connecting elements and securing each of the matched second and first holes with fasteners, wherein after the step f), each of the connecting elements is interposed between the region of the structural part of the load aerostructure and a respective one of the first submodule or the second submodule.

2. The method according to the claim 1, wherein following the step e) and before the step f), performing the following step:

providing an aperture in the structural part of the load aerostructure for each of the connecting elements, wherein each of the apertures is smaller than the each of the connecting elements to be mounted over the aperture, wherein, for each of the connecting elements, the second set of second holes is drilled in a zone of the structural part proximal to each aperture.

3. The method according to claim 1, wherein at least one of the connecting elements includes a first part and a second part perpendicular to the first part:

wherein the step c) is performed for each of the first part and the second part of the at least one of the connecting elements including the first part and the second part;

wherein the step e), for the at least one of the connecting elements including the first part and the second part, the region is a first region into which the second set of second holes is drilled to correspond to the first holes in the first part of the at least one of the connecting elements including the first part and the second part; and wherein the step e) includes drilling a third set of second holes in a second region of the structural part and the third set of the second holes corresponds to respective first holes of the first holes in the second part of the at least one of the connecting elements including the first part and the second part and the second region is proximal to the first region; and in the step f), the assembly of the at least one module assembly and the first part and the second part of the at least one of the connecting elements including the first part and the second part is performed by matching each of the second holes in first region to respective first holes of the first holes in the first part and matching each of the second holes in the second region to respective first holes of the first holes in the second part so that after the assembly the first part of the at least one of the connecting elements including the first part and the second part is between the first region of the structural part and one of the first submodule or the second submodule and the second part of the at least one of the connecting elements including the first part and the second part is between the second region of the structural part and the one of the first submodule or the second submodule.

4. The method according to claim 1, wherein the step b) comprises providing two or more of the connecting elements for at least one of the first submodule or the second submodule, and wherein in the step e), each of the connecting elements is attached to the at least one of the first submodule or the second submodule such that each of the connecting elements are spaced apart from each other on the at least one of the first submodule or the second submodule.

5. The method according to claim 1, wherein each of the first set of the first holes is drilled in a respective peripheral region of each of the connecting elements.

6. The method according to claim 1, wherein the maximum distance B is less than 300 cm.

7. The method according to claim 1, wherein in the step f) the securing is performed by bolting and/or riveting.

8. The method according to claim 1, wherein at least one of the first submodule, the second submodule, or the connecting elements are resilient.

9. The method according to claim 1, wherein the module assembly comprises a system that comprises at least one of: a mechanical system, an electrical system, a pneumatic system or a hydraulic system and between the first submodule and the second submodule, and wherein the system includes the at least one connection between said first submodule and the second submodule.

10. The method according to claim 1, wherein the at least one module assembly comprises at least one of: a pipe, an electric harness, a pump or a reservoir.

11. The method according to claim 1, wherein the connecting elements are formed of a metallic or composite material.

12. The method according to claim 2, wherein for each of the connecting elements, the aperture in the structural part has a shape corresponding to a contour of a respective connecting element of the connecting elements to be mounted over the aperture.

13. The method according to claim 1, wherein at least one of the step c), the step e), or the step f) is performed by numerical control.

14. The method according to claim 1, wherein the structural part of the load aerostructure is at least one of: a floor, a frame or a beam.

15. The method according to claim 1, wherein:

the load aerostructure is a nacelle of an aircraft, the nacelle comprises a primary structure including a ceiling, a floor and transverse frames connecting the ceiling and the floor, before the step f), the primary structure of the nacelle is provided without at least one side wall so that at least one lateral face of the primary structure of the nacelle is open to allow performance of the step f), and the step f), includes the at least one module assembly and each of the corresponding connecting elements being installed in the load aerostructure using the at least one open lateral face of the primary structure of the nacelle; and after the step f), installing the at least one side wall of the primary structure of the nacelle to close the at least one lateral face of the primary structure of the nacelle.

* * * * *